(12) United States Patent
Griffin et al.

(10) Patent No.: US 12,393,732 B2
(45) Date of Patent: Aug. 19, 2025

(54) AUTOMATIC DATA OBFUSCATION (71) Applicant: Insight Direct USA, Inc., Chandler, AZ (US)

(72) Inventors: Michael Griffin, Wayland, MA (US); Catherine Jean Snell, Durham, NC (US); Dhairya Kothari, Chicago, IL (US); Jason Rader, Jacksonville, FL (US)

(73) Assignee: Insight Direct USA, Inc., Chandler, AZ (US)

( * ) Notice: Subject to any disclaimer, the term of this patent is extended or adjusted under 35 U.S.C. 154(b) by 148 days.

(21) Appl. No.: 18/376,717

(22) Filed: Oct. 4, 2023

(65) Prior Publication Data

US 2024/0119179 A1 Apr. 11, 2024

Related U.S. Application Data (60) Provisional application No. 63/413,794, filed on Oct. 6, 2022.

(51) Int. Cl.
*G06F 21/62* (2013.01)

(52) U.S. Cl.
CPC ...... *G06F 21/6263* (2013.01); *G06F 21/6254* (2013.01)

(58) Field of Classification Search
CPC .................. G06F 21/6263; G06F 21/6254
USPC .............................................. 726/26
See application file for complete search history.

(56) References Cited

U.S. PATENT DOCUMENTS

| | | | |
|---|---|---|---|
| 10,904,261 B2 | 1/2021 | Atanda | |
| 2011/0208717 A1* | 8/2011 | Pierce | G06F 16/951 707/E17.112 |
| 2013/0282759 A1* | 10/2013 | Proux | G06F 16/953 707/774 |
| 2016/0170778 A1* | 6/2016 | Kalyanpur | G06F 9/451 703/22 |
| 2018/0121552 A1* | 5/2018 | Bostick | G06F 21/6254 |
| 2018/0121677 A1* | 5/2018 | Avancha | G06F 21/6245 |
| 2018/0246973 A1 | 8/2018 | Zhao et al. | |
| 2020/0082290 A1 | 3/2020 | Pascale et al. | |
| 2021/0124840 A1 | 4/2021 | Dotan-Cohen et al. | |
| 2021/0256159 A1 | 8/2021 | Ninglekhu et al. | |
| 2021/0342472 A1 | 11/2021 | Forman et al. | |
| 2022/0027751 A1 | 1/2022 | Hatfield et al. | |
| 2022/0043840 A1 | 2/2022 | Wilshinsky | |

(Continued)

FOREIGN PATENT DOCUMENTS

| | | |
|---|---|---|
| EP | 3580687 B1 | 8/2021 |
| JP | 2015103248 A | 6/2015 |

(Continued)

*Primary Examiner* — Thanh T Le
(74) *Attorney, Agent, or Firm* — Kinney & Lange, P.A.

(57) ABSTRACT

A method of protecting user privacy online includes collecting, via a computer-based user data agent, user data generated by a user on a user device and identifying a first set of traits associated with the user data. The method further includes generating a user profile based on the first set of traits associated with the user data and generating an alternate persona defined by a second set of traits that is different from the first set of traits. The method further includes automatically performing online activities based on the alternate persona to produce artificial user data that obscures real user data.

20 Claims, 5 Drawing Sheets

(56) References Cited

U.S. PATENT DOCUMENTS

| | | | |
|---|---|---|---|
| 2022/0075899 A1 | 3/2022 | Richardson et al. | |
| 2022/0092219 A1 | 3/2022 | Evans | |
| 2022/0172250 A1* | 6/2022 | Hall | ............... H04L 63/083 |
| 2022/0222377 A1 | 7/2022 | Kalia et al. | |
| 2023/0367855 A1* | 11/2023 | Garcia-Arellano | ...... G06N 3/08 |

FOREIGN PATENT DOCUMENTS

| | | |
|---|---|---|
| TW | 202129519 A | 8/2021 |
| WO | 2022046773 A1 | 3/2022 |

* cited by examiner

AUTOMATIC DATA OBFUSCATION

CROSS-REFERENCE TO RELATED APPLICATION

This application claims the benefit of U.S. Provisional Application No. 63/413,794, filed Oct. 6, 2022, and entitled "AUTOMATIC DATA OBFUSCATION," the disclosure of which is hereby incorporated by reference in its entirety.

BACKGROUND

The present disclosure relates generally to online user data generation and more specifically to systems and methods for obscuring online user data that is generated.

Whenever someone uses the internet, such as via an application on their mobile device or via their browser, data can be collected by various entities (i.e., online providers or profilers) who may use or sell that data. Sometimes this is unavoidable if a user wants to take advantage of the functionality of an application, website, or other internet platform. For example, if a user wants to use a mobile application to listen to music, that user must accurately provide a selection of music to play, or they will not receive accurate results. However, now that data relating to the user's music preference (and potentially other insights) will be shared with the online provider for the application. Individual internet users generally have little to no control over how their data is used by an online provider or to whom it is sold, despite the personal nature of some of the data. In many cases, online providers maintain a "profile," or a digital representation of a person, that defines the individual as a collection of certain data attributes. Any application, website, digital platform, etc. having data about the individual can sell it to an advertising company, who can then use that data to tailor advertisements to the individual. Although many applications allow a user to turn off personalized ads, this does not prevent companies from collecting data about the user.

SUMMARY

In one example, a method of protecting user privacy online includes collecting, via a computer-based user data agent, user data generated by a user on a user device and identifying a first set of traits associated with the user data. The method further includes generating a user profile based on the first set of traits associated with the user data and generating an alternate persona defined by a second set of traits that is different from the first set of traits. The method further includes automatically performing online activities based on the alternate persona to produce artificial user data that obscures real user data.

In another example, a system for protecting user privacy online includes a user device and a computer-based user data agent that includes one or more processors and computer-readable memory encoded with instructions that, when executed by the one or more processors, cause the computer-based user data agent to collect user data generated by a user on the user device and identify a first set of traits associated with the user data. The instructions further cause the computer-based user data agent to generate a user profile based on the first set of traits associated with the user data and generate an alternate persona defined by a second set of traits that is different from the first set of traits. The instructions further cause the computer-based user data agent to automatically perform online activities based on the alternate persona to produce artificial user data that obscures real user data.

DETAILED DESCRIPTION

According to techniques of this disclosure, a user data system can generate both real and artificial user data and can include a computer-based user data agent for generating the artificial user data. The artificial user data can be used to obscure the real user data and/or to automatically tailor online sub-accounts within an overall user account on behalf of a user. The user data system disclosed herein and corresponding methods are described below with reference to FIGS. 1-5.

Figure 1:
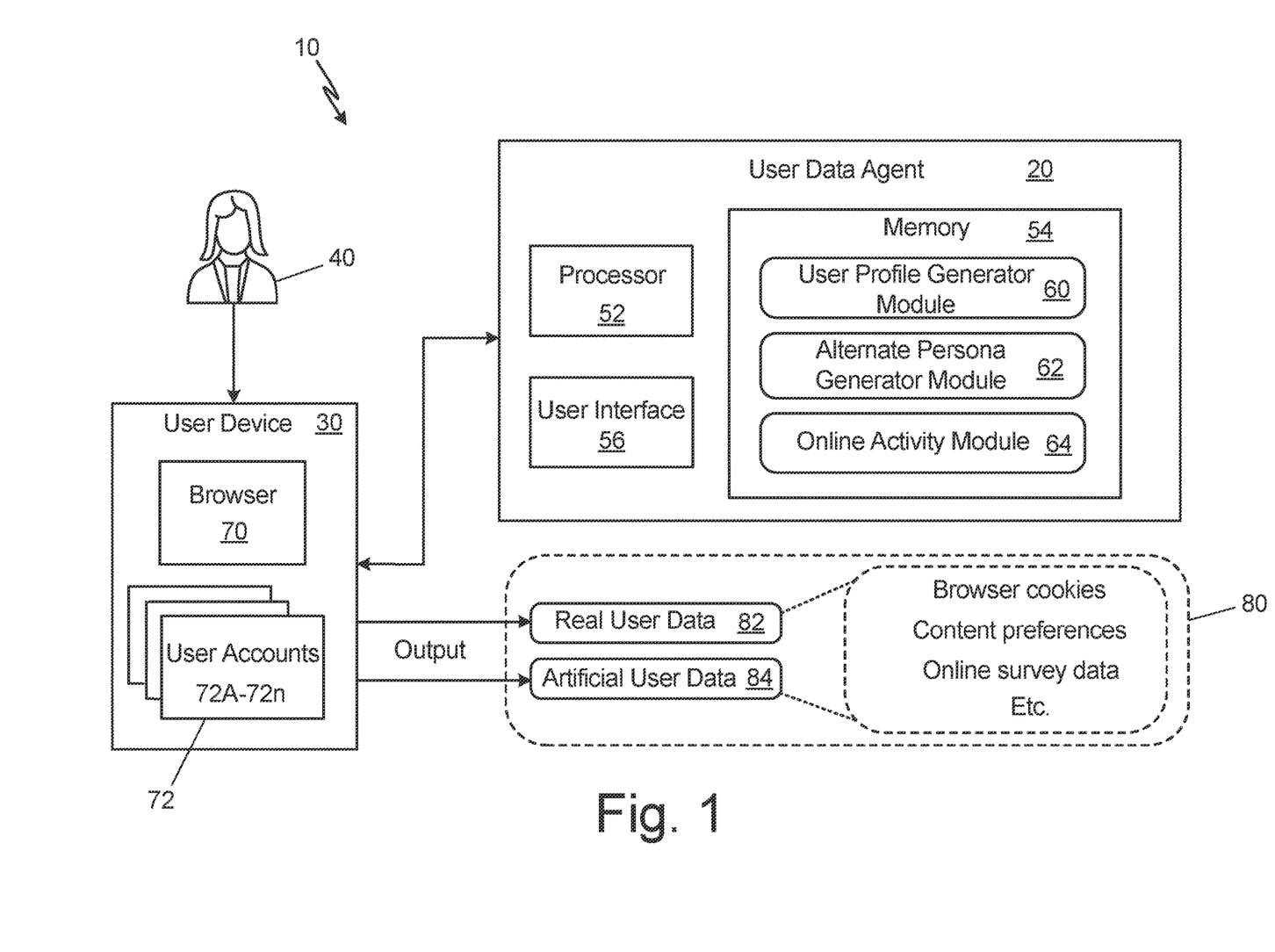
FIG. 1 is a schematic block diagram showing a user data system for producing real and artificial user data.

FIG. 1 is a schematic block diagram showing user data system 10 for generating real and artificial user data. As illustrated in FIG. 1, user data system 10 includes user data agent 20, user device 30, and user 40. User data agent 20 includes processor 52, memory 54, and user interface 56. User data agent 20 further includes user profile generator module 60, alternate persona generator module 62, and online activity module 64. User device 30 includes browser 70 and user accounts 72 (including user accounts 72A-72n). As is further shown in FIG. 1, user data system 10 produces user data 80, which includes real user data 82 and artificial user data 84.

User data system 10 is a system for generating both real and artificial user data. In one, non-limiting example, user data system 10 can be a data obfuscation system for obscuring real user data 82 with artificial user data 84. In another example, user data system 10 can be a system for automatically generating artificial user data 84 to automatically tailor online sub-accounts within an overall user account on behalf of user 40.

User data agent 20 is a computer-based platform for defining and carrying out the functionality described herein. User data agent 20 can take the form of one or more computers, each including a processor and memory. In some examples, user data agent 20 can be implemented as a dedicated computer. In other examples, user data agent 20 can be implemented on a computer that makes up part of user device 30. That is, user data agent 20 can include dedicated hardware or can include software that runs on client hardware. In some examples, user data agent 20 can be embodied in a mobile application that is downloaded to user device 30 and runs on user device 30. In other examples, user data agent 20 can include a browser-based application that runs within browser 70 on user device 30. In yet other examples, user data agent 20 can include a browser extension, such as an extension available from browser 70 or which could be directly downloaded from a web server and installed on user device 30. In any such examples, user data agent 20 can also include a web server (not shown) for distributing code to the application or extension, which may include running an application programming interface (API) to connect to mobile applications. Moreover, although not shown in FIG. 1, user data agent 20 can include any suitable communication interface modules (software and/or hardware) for establishing communication with other components of user data system 10, such as user device 30. For example, the communication interface modules can account for authorization or security requirements for accessing data from user device 30 (e.g., from a password manager installed on user device 30).

User data agent 20 includes processor 52, memory 54, and user interface 56. Although processor 52 and memory 54 are illustrated in FIG. 1 as being separate components of a single computer device, it should be understood that in other examples, processor 52 and memory 54 can be distributed among multiple connected devices. In other examples, memory 54 can be a component of processor 52. Processor 52 is configured to implement functionality and/or process instructions within user data agent 20. For example, processor 52 can be capable of processing instructions stored in memory 54. Examples of processor 52 can include one or more of a processor, a microprocessor, a controller, a digital signal processor (DSP), an application specific integrated circuit (ASIC), a field-programmable gate array (FPGA), or other equivalent discrete or integrated logic circuitry.

Memory 54 can be configured to store information before, during, and/or after operation of user data agent 20. Memory 54, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 54 can be entirely or partly temporary memory, meaning that a primary purpose of memory 54 is not long-term storage. Memory 54, in some examples, is described as volatile memory, meaning that memory 54 does not maintain stored contents when power to devices (e.g., hardware of user data agent 20) is turned off. Examples of volatile memories can include random access memories (RAM), dynamic random access memories (DRAM), static random access memories (SRAM), and other forms of volatile memories. Memory 54, in some examples, also includes one or more computer-readable storage media. Memory 54 can be configured to store larger amounts of information than volatile memory. Memory 54 can further be configured for long-term storage of information. In some examples, memory 54 includes non-volatile storage elements. Examples of such non-volatile storage elements can include magnetic hard discs, optical discs, flash memories, or forms of electrically programmable memories (EPROM) or electrically erasable and programmable (EEPROM) memories.

Memory 54 is encoded with instructions that are executed by processor 52. For example, memory 54 can be used to store program instructions for execution by processor 52. In some examples, memory 54 is used by software or applications running on processor 52 to temporarily store information during program execution.

User interface 56 can be included as part of user data agent 20 to allow users 40 to interact with user data agent 20 in user data system 10. For example, user interface 56 can allow users 40 to review, input, or update a user profile for user profile generator module 60; to select, modify, or set preferences related to personas generated by alternate persona generator module 62; to configure aspects of user data agent 20, such as by setting permissions or limits for online activity module 64, providing user data agent 20 with access to credentials for user accounts 72, or other possible configurations; etc. In some examples, user interface 56 includes a graphical user interface (GUI) that includes graphical representations of information or steps for user 40 that are associated with user data agent 20. For example, the GUI could include drop-down menus that list suggestions of alternate personas for user 40 to select from.

User device 30 can be any device associated with user 40 that is capable of connecting to and communicating data using the internet. For example, user device 30 can take the form of a desktop computer, a laptop, a tablet, a smartphone, or any other similar device. In some examples, user device 30 is a mobile device. User device 30 includes browser 70. Browser 70 is an internet browser for accessing websites on the World Wide Web or a local network. Browser 70 can be any internet browser that is available on the market, such as Google Chrome, Microsoft Edge, Firefox, Safari, etc., or can be a custom browser. User device 30 also includes user accounts 72. User accounts 72 can represent any one or more user accounts 72A-72$n$ ("n" is used herein as an arbitrary integer to indicate any number of the referenced component) set up by user 40 through which user 40 can access online services from a respective online provider. User accounts 72 can also be referred to as online user accounts. To name a few non-limiting examples, user accounts 72 can be social media accounts (such as Twitter, Facebook, Instagram, etc.), streaming service accounts (such as YouTube, Netflix, Hulu, Spotify, etc.), or other similar account types. More generally, user accounts 72 can be described as online content service accounts that are associated with corresponding online content services. In some examples, one or more user accounts 72 may be accessed by logging in using a web page on browser 70. In other examples, one or more user accounts 72 may be accessed by logging in to an application, such as a mobile application that is downloaded to user device 30. User data 80 is generated from online activity on browser 70 and/or via user accounts 72.

User data agent 20 can be further defined as a set of functional modules. Although user data agent 20 is described herein as being divided into three modules, it should be understood that the functionality of user data agent 20 could also be described as more or fewer modules, which could depend, in some examples, on how the code is written or organized. As illustrated in FIG. 1, user data agent 20 includes user profile generator module 60, alternate persona generator module 62, and online activity module 64. User profile generator module 60, alternate persona generator module 62, and online activity module 64 will be described sequentially; however, these modules need not always be performed in any particular order and may also include overlapping or interspersed functionality.

User profile generator module 60 is a first functional module of user data agent 20. User profile generator module 60 can include methods in code for creating a baseline set of information about user 40 (i.e., a user profile). Whenever user 40 performs an online activity—such as browsing web pages or streaming videos, for example—user data is produced, and the online provider associated with each activity can collect the user data and create a respective user profile. Similarly, user profile generator module 60 can monitor the online behavior of user 40 and collect user data that is associated with these online activities; however, user profile generator module 60 monitors online behavior and collects user data on behalf of user 40. In some examples, user profile generator module 60 can collect user data from all of the online behavior for user 40 (i.e., all applications, all web pages, etc.). In such cases, the user profile generated by user profile generator module 60 can be considered a generalized profile. In other examples, user profile generator module 60 may only collect user data from some of these online behaviors or from particular online platforms. In some examples, user 40 can identify a subset of online behaviors or platforms from which user profile generator module 60 should collect user data via an input to user interface 56.

User profile generator module 60 can collect user data associated with online activities of user 40 in several ways. In one example, user profile generator module 60 can analyze browser cookies stored on user device 30 that have been generated by online activities of user 40. In another example, user profile generator module 60 can import information about user 40 from one or more user accounts 72A-72n. In yet other examples, user 40 could manually input information into user profile generator module 60 via user interface 56. Alternatively, user profile generator module 60 can mine user data from existing profilers. That is, user profile generator module 60 could request and receive a report with some or all the user data associated with user 40 that has already been collected by an online provider, and user profile generator module 60 could read in the information from this pre-existing profile. Any one or more of these techniques for collecting initial user data can be used independently or in combination by user profile generator module 60.

In any of these cases, user profile generator module 60 can derive and identify a first set of traits associated with the collected user data. The user data collected by user profile generator module 60 can encompass one or more traits or factors that characterize the online behavior of user 40. The traits can represent different categories of information, such as age, sex, political affiliation, movie genre preference etc. Some of these categories may represent common values that are present in almost all user data. Deriving the first set of traits can involve predictive models for predicting traits based on the raw user data collected by user profile generator module 60, data inference techniques (e.g., a user clicked on 50 articles about golf this year so the user must be a golfer), categorical determinations (sex, gender, age), or other techniques. Additionally, if a pre-existing profile from an online provider is available, deriving the first set of traits could also include developing a model that mirrors the data collection technique that was used to generate the pre-existing profile. User profile generator module 60 can also match or abstract the traits associated with user 40 to pre-defined clusters or groups of users (e.g., persons aged 18-25, football fans, etc.). In this way, comparisons can be made more easily between the user profile generated by user profile generator module 60 and alternate personas generated by alternate persona generator module 62.

The first set of traits and the clusters that the traits fit into define a user profile. Accordingly, user profile generator module 60 generates a user profile based on the first set of traits associated with the collected user data. The user profile can be automatically generated by user profile generator module 60 after the desired user data is collected.

Alternate persona generator module 62 is a second functional module of user data agent 20. Alternate persona generator module 62 can include methods in code for generating one or more alternate personas (e.g., personas 85, as will be described in greater detail below in two examples with respect to FIGS. 2-3). In general, alternate personas can be defined by respective sets of traits that are different from the first set of traits that defines the user profile generated by user profile generator module 60. Alternate persona generator module 62 can automatically generate one or more alternate personas, and the one or more of the alternate personas can be utilized by online activity module 64. That is, in some examples, multiple alternate personas may be utilized simultaneously by online activity module 64. As will also be described in greater detail below with respect to FIG. 2, alternate persona generator module 62 can generate multiple candidate personas, and one or more alternate personas can be selected from amongst the candidate personas. For example, user 40 can review the candidate personas and either directly select an alternate persona or can set parameters for selecting the alternate persona via user interface 56. User 40 can set parameters such as desired traits, limitations on how the alternate persona will be used in online activity module 64, etc. In other examples, user 40 can select traits (e.g., from pool of pre-defined common options) before alternate personas are generated to create customized alternate personas. In some examples, alternate personas can be generated primarily or entirely using common values, i.e., traits that can be sorted into categories that are common across many users. For example, if several applications all require users to enter their age and sex, then these would be common values that could be used to generate alternate personas. In such an example, one alternate persona that might be generated could be defined as "male over age 50," another alternate persona could be defined as "female age 25-35," and so on.

There are several approaches that could be used to determine how different from the user profile an alternate persona should and/or will be. In general, the idea is that each alternate persona will be defined by a set of traits that is in some way different from the set of traits that defines the user profile. In one example, this could be accomplished by using a random selection of traits or clusters available from common options. The random traits are unlikely to be exactly the same as the traits associated with the user profile. In another example, alternate persona generator module 62 could determine what an average or median profile would be, identify its traits, and generate an alternate persona based on the traits associated the average or median profile. In other examples, alternate persona generator module 62 can use the user profile generated by user profile generator module 60 as a starting point and then make changes away from the derived traits that define the user profile. This could also be accomplished in several different ways. In one example, alternate persona generator module 62 could create random differences in the traits associated with the user profile to develop an alternate persona with a new set of traits. In another example, alternate persona generator module 62 could identify key traits associated with the user profile and then intelligently generate an alternate persona that differs in those key traits. In yet another example, alternate persona generator module 62 could evaluate an existing pool of traits or clusters to identify opposite traits and generate an alternate persona based on traits that are opposite from the traits that define the user profile (i.e., an "anti-" or "counter-" persona). In some examples, specific anti-personas could be targeted against individual pre-existing profiles put together by profilers.

Alternate persona generator module 62 can also include machine learning techniques to train and develop models for intelligently generating alternate personas. From a practical standpoint, a machine learning-based model for alternate persona generator module 62 could ultimately change the code for user data agent 20, and any code updates would need to be pushed to application or browser extension versions of user data agent 20. In an implementation of alternate persona generator module 62 that uses machine learning, a model could be trained using the user profile generated by user profile generator module 60. A model could also be trained using a set of sample user profiles or clusters of data (e.g., anonymized/de-identified data available from data brokers). Trained models could then be used to populate alternate personas with traits and/or clusters of traits to intelligently generate more sophisticated alternate personas. Some examples of alternate persona generator module 62 can function similar to a generative adversarial network (GAN) by analyzing and blending information from lots of sample profiles to generate an alternate persona that would produce a profile that is indistinguishable from the sample profiles. Any one or more of the above techniques for generating alternate personas can be used independently or in combination by alternate persona generator module 62.

Alternate personas generated by alternate persona generator module 62 may only be stored locally on user device 30 in order to prevent the personas from potentially being reverse-engineered or linked to the real user profile. In other examples, user data agent 20 could store generated alternate personas in a secure database or other data storage to utilize the personas as options for users to select from when using user data agent 20.

Alternate persona generator module 62 can also include limitations built into the code to prevent certain types of alternate personas from being generated or selected. For example, alternate persona generator module 62 can have a pre-defined list of off-limits traits that cannot be selected or used for generating alternate personas. To some extent, such a list could be configurable by user 40, e.g., to add additional restrictions. Additionally, there could be built in limitations on the number of alternate personas that alternate persona generator module 62 is permitted to generate and that user 40 can use in user data system 10. These limitations and other similar limitations would prevent alternate persona generator module 62 from generating undesirable personas.

Online activity module 64 is a third functional module of user data agent 20. In some examples, online activity module 64 is a sequentially last functional module of user data agent 20. Online activity module 64 can include methods in code for automatically performing online activities based the one or more alternate personas generated by alternate persona generator module 62. The online activities carried out by online activity module 64 can be referred to as "false trail" activities. Online activity module 64 performs online activities on user device 30, e.g., using browser 70 and/or user accounts 72. Online activity module 64 surfs the web, uses applications, and/or performs other online activities on user device 30 as a user who embodies the one or more alternate personas would.

In one example, online activity module 64 can automatically generate, remove, or modify/alter browser cookies using any existing cookie editing functionality of browser 70. In some such examples, modifying cookies could more specifically include changing the information represented therein (e.g., "likes cookies" changed to "dislikes cookies"). Another example of cookie editing can include clearing and replacing all existing browser cookies periodically or based on pre-defined trigger events. That is, online activity module 64 can clear all existing browser cookies associated with user 40 on user device 30 and can replace them with browser cookies generated based on the traits of the alternate persona. In some examples, user data agent 20 can include functionality for storing sets of browser cookies (e.g., a set that corresponds to real user data 82 and a set that corresponds to artificial user data 84) so that the sets can be alternately deployed via online activity module 64. In this way, the alternate personas and online activity module 64 can be used to modify how user data 80 appears to profilers without fully obscuring real user data 82. This can, in effect, give user 40 a more precisely tuned user experience when using online platforms.

Because there may be very little standardization for what a specific cookie is or means between different websites, the cookie editing functionality of online activity module 64 can, in some examples, include many different methods for editing different types of cookies. Online activity module 64 can also include some form of automatic clicking to mimic a user selecting an item on a web page or within an application. Some online providers track click histories, so automatic clicking can be used separately or to augment cookie editing functionality of online activity module 64.

In some examples, online activity module 64 can also perform online activities via user accounts 72. Accordingly, online activity module 64 can include functionality for accessing and logging into user accounts 72. In some examples, this functionality may require user 40 to configure permissions for user data agent 20, such as for giving user data agent 20 access to a user credentials manager installed on user device 30. In this way, user data agent 20 would not need to store any user credentials outside of user device 30. By accessing user accounts 72, online activity module 64 can perform several additional types of online activities. In one example, online activity module 64 can generate artificial search terms based on the traits of the alternate persona and input the artificial search terms into a search engine to generate artificial searches. As described previously, user accounts 72 can be online content service accounts for online content services (e.g., streaming services like YouTube, Netflix, Hulu, Spotify; social media like Facebook or Instagram; etc.). In some examples, online activity module 64 can select or interact with content from the online content services via corresponding ones of user accounts 72. For example, if the content is a video or audio media resource, online activity module 64 can automatically play or subscribe to the video or audio media resource based on the traits of the alternate persona. If the content is an online survey, online activity module 64 can automatically complete and submit the online survey based on the traits of the alternate persona.

Like alternate persona generator module 62, online activity module 64 can include limitations built into the code to prevent certain types of online activities from being carried out on user device 30 or other misuses. For example, there can be limits on the total number of false trail activities that can be carried out by online activity module 64 in a defined period of time, such as an hour, a day, or other increments. Additionally, certain types of online activities may be actively prevented from occurring (or user data agent 20 may simply not include code for performing such activities). Online activities that might be prevented or highly limited (e.g., limited to simulating some steps without completing the activity) can including writing and sending fake emails, making fake purchases, or creating fake GPS locations. These limitations can be implemented so that the operation of user data system 10 is compatible with, e.g., the terms and conditions for using online platforms. Other limitations can include limiting when or for how long online activity module 64 can run and/or limiting access to some user accounts 72. For example, online activity module 64 could include limitations in the code that only permit it to perform false trail activities on one account of each type, such as one Facebook account, one Netflix account, etc. As with limitations applicable to alternate persona generator module 60, limitations applicable to online activity module 64 can also be configurable by user 40 in some cases or to some extent.

User data 80 includes real user data 82 and artificial user data 84. User data 80 can be generated by corresponding online activities using browser 70 and/or via user accounts 72 (which may or may not be accessed using browser 70). Accordingly, user data 80 also represents data that can be collected by online providers. For example, user data 80 can include information stored in browser cookies, which can take numerous different forms, such as "click" history representing online content user 40 has interacted with previously, auto-fill information for forms (such as a birth date, addresses, phone numbers, etc.), and many others. User data 80 can also include search history from web searches conducted using browser 70 or click or search history generated within user accounts 72 for applications. More generally, user data 80 can include any type of data that is generated from online activities carried out on user device 30.

Real user data 82 represents portions of user data 80 that are generated by user 40 without intervention of user data agent 20. That is, real user data 82 represents "real" online activity by user 40. In contrast, artificial user data 84 represents portions of user data 80 that are generated within user data system 10 via user data agent 20. That is, artificial user data 84 represents data that is generated via online activity module 64 based on the persona or personas selected from alternate persona generator module 62. In other words, artificial user data 84 does not necessarily represent "real" online activity by user 40. The idea is that artificial user data 84 is indistinguishable from real user data 82 within user data 80 or that online providers will be unable to determine that artificial user data 84 is generated by user data agent 20 rather than user 40. In some examples, artificial user data 84 overwhelms the representation of real user data 82 in a user profile thereafter created by an online provider such that the user profile will no longer be based on traits actually associated with user 40. In other examples, artificial user data 84 can be used as a supplement to real user data 82 to introduce more nuance or distinction between different profiles created by online providers (e.g., as will be described with respect to FIG. 3).

User data is often analyzed by profilers using algorithms that look for patterns in the user's behavior. User data system 10, according to techniques of the present disclosure, allows a user to automatically obscure some of the patterns in their online behavior, making much of that data worthless to profilers. More specifically, user data 80 can become less valuable to profilers when it includes artificial user data 84 because advertising companies will not want to waste effort directing advertisements to an artificial persona. When the automatically generated user data becomes less valuable or even worthless to profilers, users are able to maintain both their privacy and a level of control over their real data.

Traditional methods for preventing profilers from discerning patterns in online behavior include a user manually performing online activities they would not normally perform, such as clicking on links they would not normally click or using applications they would not normally use. This is at the very least time-consuming and is probably not destructive enough to the user's online profile to make their data useless. Another option would be to simply not use the internet, but that is a highly disruptive and restricting option that severely reduces the functionality of internet-based applications and other internet platforms and is not realistic for most users in the modern world. Other related techniques in the ballpark of improving user privacy online, such as using virtual private networks (VPNs) or The Onion Router (TOR), generally work to improve security of online communications for a user but do not obscure a user's real data.

User data system 10 including user data agent 20 allows users to obscure their data without having to sacrifice total functionality of internet-based applications. Although user data system 10 to some extent prioritizes privacy over having highly personalized recommendations, operation of user data agent 20 overall has minimal impact to a user's online experience in that user 40 can continue using the full functionality of applications, etc., on user device 30 without concern that their user data will be misused or sold. Moreover, as described above with respect to the cookie editing functions of online activity module 64, user data system 10 includes options for only partially or transiently obscuring real user data 82. Once real user data 82 is obscured by artificial user data 84, online providers can no longer target user 40 in ways that may be undesired.

User data system 10 is also highly customizable for different users and their respective privacy or user data generation concerns because users 40 can modify or select traits for alternate persona generator module 62 to use for generating alternate personas. Moreover, artificial user data 84 is automatically generated through operation of online activity module 64, and, thus, requires minimal effort by user 40 to modify the data that is available to profilers. User data system 10 also has the advantage that user data agent 20 does not need to be especially accurate in causing artificial user data 84 to be produced (e.g., artificial user data 84 does not need to be exactly opposite of real user data 82) because obfuscation can be accomplished simply by bombarding online providers with junk data. In this way, user data system 10 can function effectively even with a relatively sparse user profile as a starting point.

Two non-limiting implementations of alternate persona generator module 62 according to techniques of this disclosure will be described with reference to FIGS. 2-3. Several components of user data system 10 shown in FIG. 1 are omitted in FIGS. 2-3 for ease of discussion, but it should be understood that either of the implementations of alternate persona generator module 62 as described with reference to FIGS. 2-3 can be used with user data system 10. Additionally, although depicted in FIGS. 2-3 as separate examples, a user data system according to techniques of this disclosure can include any combination of the following features.

Figure 2:
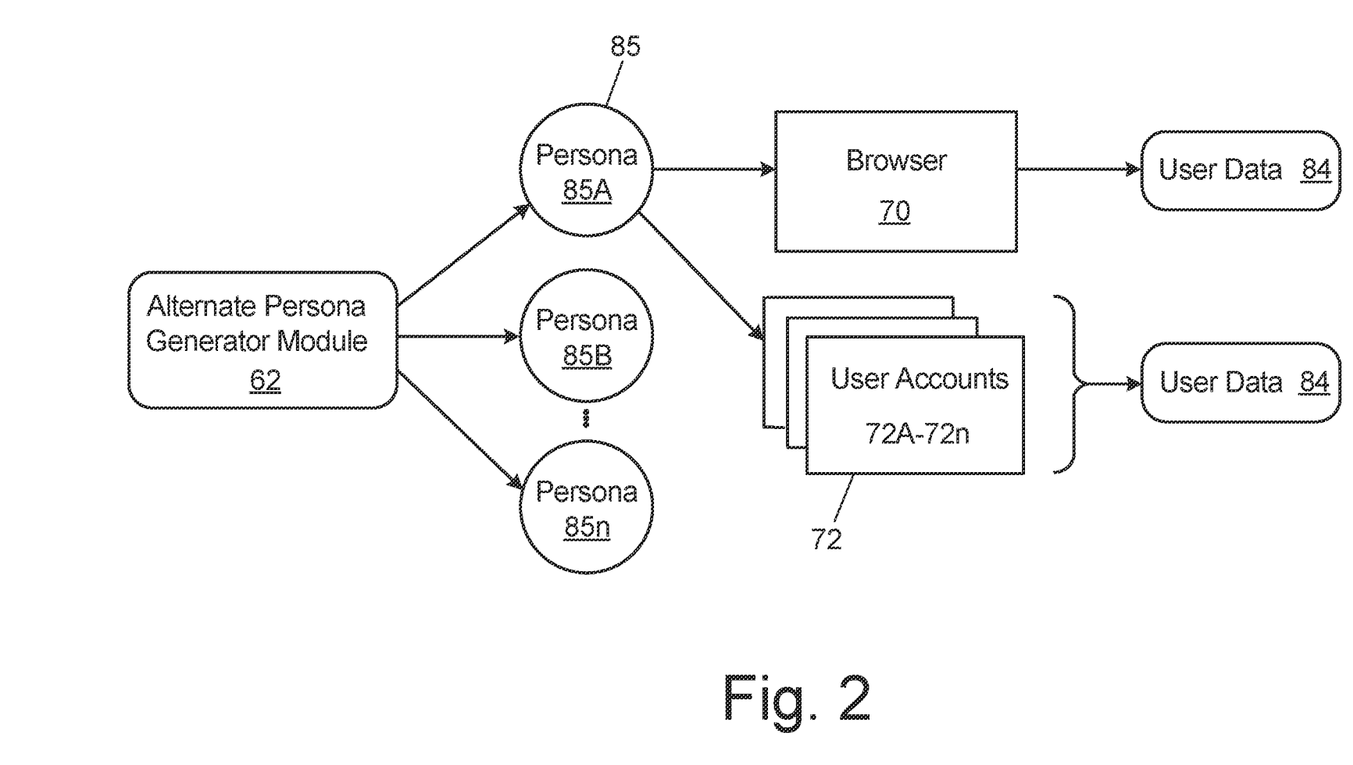
FIG. 2 is a schematic block diagram showing details of a first example of generating and using alternate personas in the user data system.

FIG. 2 is a schematic block diagram showing details of a first example of generating and using alternate personas 85 in user data system 10. FIG. 2 shows alternate persona generator module 62 (of user data system 10 shown in FIG. 1), browser 70, user accounts 72 (including user accounts 72A-72n), and artificial user data 84.

Additional details of alternate persona generator module 62 are described above with reference to FIG. 1. As shown in FIG. 2, alternate persona generator module 62 generates personas 85A-85n. Personas 85A-85n can include any number of distinct personas 85. Personas 85 can include several candidate personas, and one or more of personas 85 can be selected to be applied to browser 70 and user accounts 72. In the example shown in FIG. 2, persona 85A is selected and applied to browser 70 and user accounts 72, whereas the remaining personas 85B-85n are rejected or unused. In other examples, any ones of personas 85A-85n can be applied to browser 70 and user accounts 72. In yet other examples, alternate persona generator module 62 may only generate one persona 85 and that persona will be applied to browser 70 and user accounts 72. Artificial user data 84 is produced from each of browser 70 and user accounts 72, e.g., via operation of online activity module 64 as shown in FIG. 1 using the selected ones of personas 85A-85n.

As described above with respect to FIG. 1, user data system 10 including alternate persona generator module 62 allows for effective, customizable, and user-friendly data obfuscation of real user data 82 with artificial user data 84.

Figure 3:
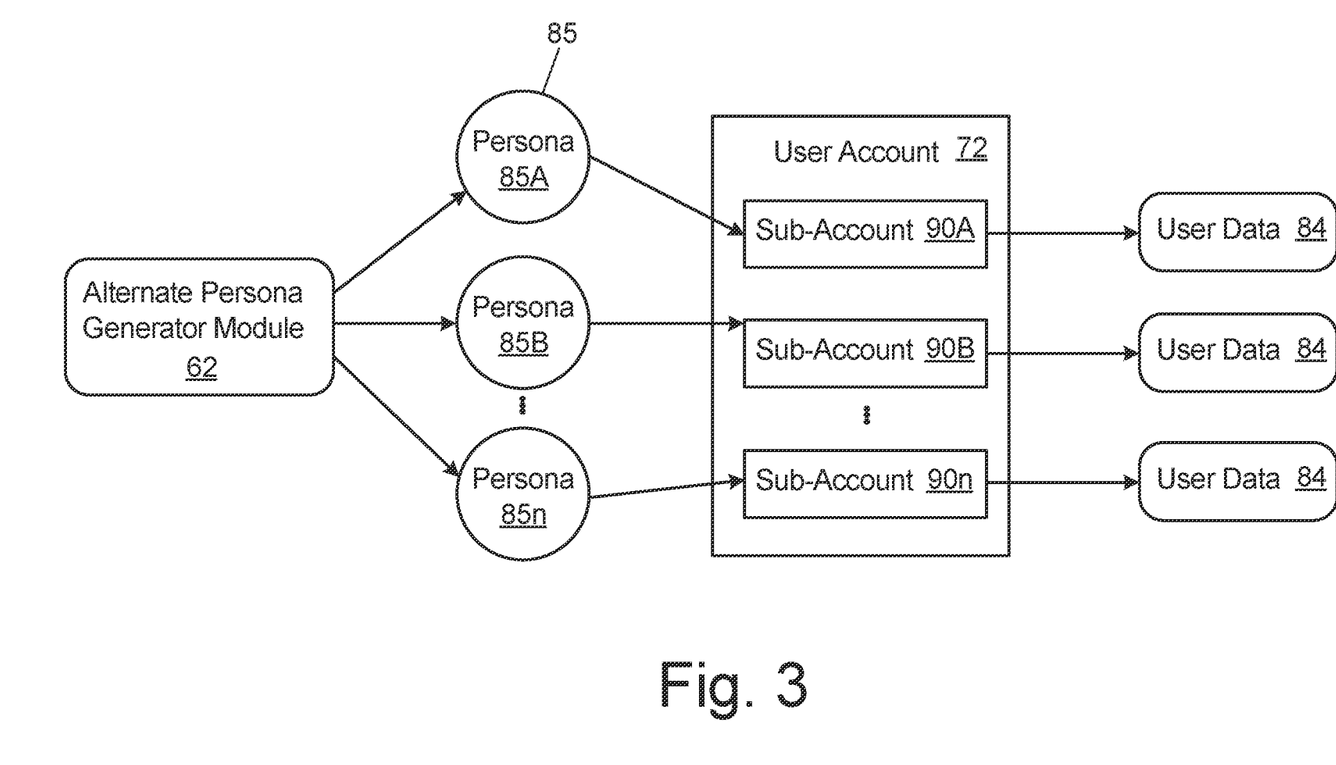
FIG. 3 is a schematic block diagram showing details of a second example of generating and using alternate personas in the user data system.

Referring now to FIG. 3, FIG. 3 is a schematic block diagram showing details of a second example of generating and using alternate personas 85 in user data system 10. FIG. 3 shows alternate persona generator module 62 (of user data system 10 shown in FIG. 1), user account 72, artificial user data 84, and personas 85 (including personas 85A-85n). As illustrated in FIG. 3, user account 72 includes sub-accounts 90A-90n.

Additional details of alternate persona generator module 62 are described above with reference to FIG. 1. As shown in FIG. 3, alternate persona generator module 62 generates personas 85A-85n. Personas 85A-85n can include any number of distinct personas 85. Rather than a single one of personas 85 being selected (e.g., as shown in FIG. 2), a number of personas 85 selected can match a number or subset of sub-accounts 90A-90n associated with user account 72. Each sub-account 90A-90n can be a subdivision of the overall user account 72 intended for multiple users to be able to separately access and use user account 72. In other examples, sub-accounts 90A-90n can be separate accounts for one user that are all accounts under one online platform (e.g., several email accounts for one user on one email service). In the example shown in FIG. 3, persona 85A is applied to sub-account 90A, persona 85B is applied to sub-account 90B, and persona 85n is applied to sub-account 90n. In other examples, any ones of personas 85A-85n can be applied any one or more of sub-accounts 90A-90n. Artificial user data 84 is produced from each of sub-accounts 90A-90n, e.g., via operation of online activity module 64 as shown in FIG. 1 using personas 85A-85n.

Alternate persona generator module 62 as described with respect to FIG. 3 could be implemented with or without user profile generator module 60 (FIG. 1). In an implementation that includes user profile generator module 60, personas 85 can automatically be built with traits different from traits associated with a user profile for user 40 that was generated by user profile generator module 60. In an implementation that does not include user profile generator module 60, user 40 could simply identify and select traits or clusters for personas 85, and alternate persona generator module 62 could then generate personas 85 based on those selected traits, rather than generating personas 85 relative to a user profile generated by user profile generator module 60. For example, a user could select a first set of traits that the user desires to associate with sub-account 90A and a second set of traits that the user desires to associate with sub-account 90B, up to an nth set of traits that the user desires to associate with sub-account 90n. Alternate persona generator module 62 can then generate corresponding personas 85A-85n based on the respective first and second through nth sets of traits.

Personas 85 can be used to produce artificial user data 84 that obscures any real user data 82 (not shown). Additionally, or alternatively, personas 85 can also be used to produce artificial user data 84 that is targeted to cause an online provider for user account 72 to generate different recommendations for each of sub-accounts 90A-90n to which one of personas 85A-85n is applied. That is, rather than obscuring data, the implementation of alternate persona generator module 62 shown in FIG. 3 can also utilize personas 85 to automatically tailor sub-accounts 90A-90n for particular purposes or situations, depending on a user's preferences. Accordingly, artificial user data 84 can be used as a supplement to real user data 82 (not shown) to automatically introduce more nuance or distinction between different profiles that are subsequently created by online providers from ones of sub-accounts 90A-90n (e.g., as compared to more generalized profiles associated with a single user).

In one non-limiting example where user account 72 is a video streaming account, a first one of sub-accounts 90A-90n (e.g., sub-account 90A) could be designated for personal use by a user; another of sub-accounts 90A-90n (e.g., sub-account 90B) could be designated for family use; and another of sub-accounts 90A-90n (e.g., sub-account 90n) could be designated for movies only rather than television shows. A first set of traits could be identified that would be associated with personal use of sub-account 90A, a second set of traits could be identified that would be associated with family use of sub-account 90B, and a third set of traits could be identified that would be associated with movie-watching only use of sub-account 90n. Alternate persona generator module 62 would then generate persona 85A based on the first set of traits, persona 85B based on the second set of traits, and persona 85n based on the third set of traits, such that corresponding ones of personas 85A-85n are generated based on traits that match the desired purpose for each of sub-accounts 90A-90n. Accordingly, respective portions of artificial user data 84 generated from each of sub-accounts 90A-90n will correspond to the traits of the one of personas 85A-85n that was applied to the sub-account.

In addition to the data obfuscation benefits described above with respect to FIGS. 1-2, the implementation of alternate persona generator module 62 shown in FIG. 3 allows a user to automatically tailor sub-accounts 90A-90n of an overall user account 72 based on the user's preferences. This provides automatic online user account management capabilities through a similar technique as described herein for intentionally obscuring real user data. More specifically, a user can automatically guide (or to some extent control) what types of recommendations they would like to receive at individual sub-accounts 90A-90n by applying different personas 85 to each sub-account and allowing user data agent 20 to produce artificial user data 84 from each sub-account, such that artificial user data 84 is in turn used by the online provider associated with the overall user account 72 to generate recommendations. In this way, this implementation of alternate persona generator module 62 is both efficient and customizable for managing sub-accounts 90A-90n of user account 72.

From the perspective of an online provider, the output of user data system 10 is similar in this implementation compared to the implementation described above with reference to FIG. 2. The main difference is more perceptible from the user's perspective in that personas 85 are not selected to have traits that obscure real user data 82, rather they are selected to have traits tailored to specific uses or preferences for ones of sub-accounts 90A-90n. This enables a user to combat persistent recommendations from online providers that may not apply to or be desirable for all aspects of the user's online activities. It also enables a user to automatically use sub-accounts 90A-90n to segment or further distinguish characteristics of their online activities, such as preferences that only apply under certain circumstances for the user.

Figure 4:
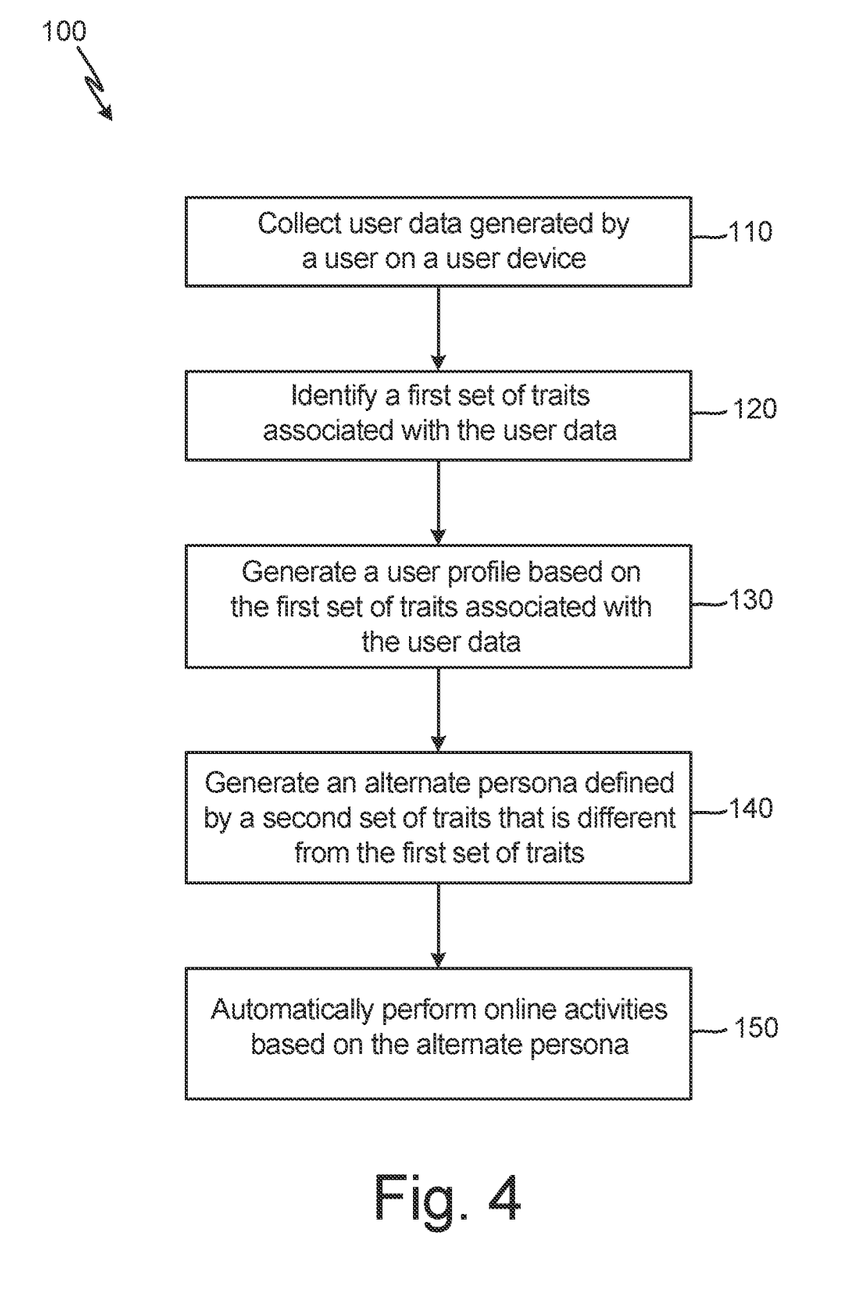
FIG. 4 is a flowchart illustrating steps of a process for protecting user privacy online.

FIG. 4 is a flowchart illustrating steps 110-150 of process 100 for protecting user privacy online. Process 100 will be described with reference to components of user data system 10 described above (FIGS. 1-3).

As illustrated in FIG. 4, a first step of process 100 is to collect user data generated by user 40 on user device 30 (step 110). The user data can be collected by user profile generator module 60, which can monitor the online behavior of the user. For example, the user data collected in step 110 can include information stored in browser cookies. At step 120, user profile generator module 60 identifies a first set of traits associated with the user data. The first set of traits can be further matched to one or more clusters or groups. At step 130, user profile generator module 60 generates a user profile based on the first set of traits associated with the user data. The user profile can be similar to a user profile that would be created by an online provider or profiler in the course of a user's normal use of the internet. Each of steps 110-130 can be carried out by user profile generator module 60.

At step 140, alternate persona generator module 62 generates an alternate persona (e.g., one of alternate personas 85) that is defined by a second set of traits that is different from the first set of traits. Several techniques for generating the alternate persona are described above with reference to FIG. 1. For example, alternate persona generator module 62 can include machine learning techniques for intelligently generating the alternate persona.

At step 150, online activity module 64 automatically performs online activities based on the alternate persona generated in step 140. The online activities performed by online activity module 64 produce artificial user data 84, which can obscure real user data 82. Step 150 can be a final step of process 100. Although illustrated as single steps, it should be understood that each of steps 110-150 can be repeated any number of times in process 100.

Process 100, including step 140 for generating an alternate persona and step 150 for automatically performing online activities based on the alternate persona, allows for effective, customizable, and user-friendly data obfuscation of real user data 82 with artificial user data 84.

Figure 5:
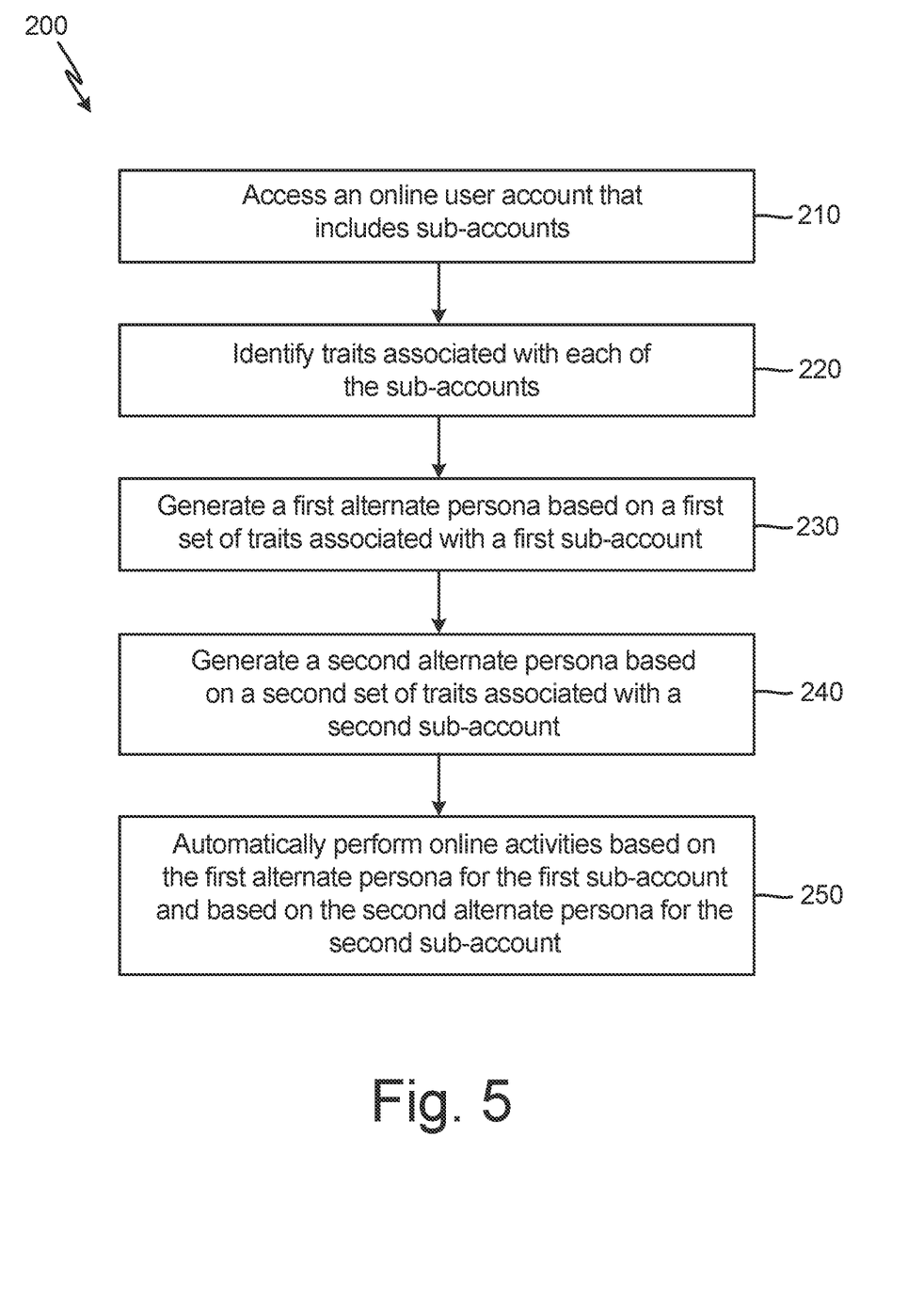
FIG. 5 is a flowchart illustrating steps of a process for tailoring online user sub-accounts.

FIG. 5 is a flowchart illustrating steps 210-250 of process 200 for tailoring online user sub-accounts. Process 200 will be described with reference to components of user data system 10 described above (FIGS. 1-3).

As illustrated in FIG. 5, a first step of process 200 is accessing online user account 72 that includes sub-accounts 90A-90n (step 210). User account 72 can be an overall account associated with an online provider, such as an online content service. Each of sub-accounts 90A-90n can be separate accounts within user account 72 that are designed to be used by different users or can be separate accounts for the same online content service. At step 220, user 40 can identify traits associated with each of sub-accounts 90A-90n, including a first set of traits associated with one of sub-accounts 90A-90n and a second set of traits associated with a different one of sub-accounts 90A-90n. The first set of traits can be different from the second set of traits. Moreover, the first set of traits can be identified based on preferences that user 40 has for how the first one of sub-accounts 90A-90n is to be used, and the second set of traits can be identified based on preferences that user 40 has for how the second one of sub-accounts 90A-90n is to be used. User 40 can select the first and second sets of traits from a collection of pre-defined traits available via user data agent 20.

At step 230, alternate persona generator module 62 generates a first alternate persona 85A-85n that is based on the first set of traits identified by user 40. Similarly, at step 240, alternate persona generator module 62 generates a second alternate persona 85A-85n that is based on the second set of traits identified by user 40. Several techniques for generating the alternate personas are described above with reference to FIG. 1. For example, alternate persona generator module 62 can include machine learning techniques for intelligently generating the alternate persona.

At step 250, online activity module 64 automatically performs online activities based on the first one of alternate personas 85A-85n for the first one of sub-accounts 90A-90n and based on the second one of alternate personas 85A-85n for the second one of sub-accounts 90A-90n to produce artificial user data 84 that tailors each of sub-accounts 90A-90n according to user preferences. Online activity module 64 can access each sub-account 90A-90n separately to perform online activities thereon. Step 250 can be a final step of process 200. Although illustrated as single steps, it should be understood that each of steps 210-250 can be repeated any number of times in process 200.

Process 200, including steps 230-240 for generating first and second alternate personas and step 250 for automatically performing online activities based on the first and second alternate personas applied to the corresponding ones of sub-accounts 90A-90n, allows for efficient and customizable tailoring of sub-accounts within an overall user account based on a user's preferences.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of protecting user privacy online, the method comprising:
    collecting, via a computer-based user data agent, user data generated by a user on a user device;
    identifying a first set of traits associated with the user data;
    generating a user profile based on the first set of traits associated with the user data;
    generating an alternate persona defined by a second set of traits that is different from the first set of traits; and
    automatically performing online activities based on the alternate persona to produce artificial user data that obscures real user data.

2. The method of claim 1, wherein collecting the user data further includes analyzing browser cookies generated by the user.

3. The method of claim 1, wherein collecting the user data further includes obtaining information associated with the user from a user account.

4. The method of claim 1, wherein generating the alternate persona further includes:

training a model with machine learning based on the user profile; and using a trained model to generate the alternate persona.

5. The method of claim 1, wherein generating the alternate persona further includes:

training a model with machine learning using a set of sample user profiles; and using a trained model to generate the alternate persona.

6. The method of claim 1, wherein generating the alternate persona further includes:

generating multiple candidate personas; and selecting the alternate persona from amongst the candidate personas.

7. The method of claim 1, wherein generating the alternate persona further includes:

analyzing a set of sample user profiles;

blending information from the set of sample user profiles; and generating the alternate persona based on blended information from the set of sample user profiles such that the alternate persona is indistinguishable from individual sample user profiles in the set of sample user profiles.

8. The method of claim 1, wherein automatically performing the online activities based on the alternate persona further includes automatically modifying browser cookies based on the alternate persona.

9. The method of claim 8, wherein automatically modifying the browser cookies further includes:

first, storing a first set of browser cookies that represents the browser cookies;

second, clearing the browser cookies from a browser on the user device;

third, replacing the browser cookies with a second set of browser cookies that are based on the alternate persona;

fourth, storing the second set of browser cookies;

fifth, clearing the second set of browser cookies from the browser;

sixth, replacing the second set of browser cookies with the first set of browser cookies; and seventh, repeating the second through sixth steps.

10. The method of claim 1, wherein automatically performing the online activities based on the alternate persona further includes accessing a user account associated with the user.

11. The method of claim 10, wherein automatically performing the online activities based on the alternate persona further includes:

generating, via the user account, artificial search terms based on the alternate persona; and inputting the artificial search terms into an online search engine to generate artificial searches.

12. The method of claim 10, wherein the user account is an online content service account, and wherein automatically performing the online activities based on the alternate persona further includes interacting with content from the online content service.

13. The method of claim 12, wherein the content is a video or audio media resource, and automatically performing the online activities based on the alternate persona further includes automatically playing or subscribing to the video or audio media resource; or wherein the content is an online survey, and automatically performing the online activities based on the alternate persona further includes automatically completing the online survey.

14. A system for protecting user privacy online, the system comprising:

a user device; and a computer-based user data agent including:

one or more processors; and computer-readable memory encoded with instructions that, when executed by the one or more processors, cause the computer-based user data agent to:

collect user data generated by a user on the user device;

identify a first set of traits associated with the user data;

generate a user profile based on the first set of traits associated with the user data;

generate an alternate persona defined by a second set of traits that is different from the first set of traits; and automatically perform online activities based on the alternate persona to produce artificial user data that obscures real user data.

15. The system of claim 14, wherein the instructions that, when executed by the one or more processors, cause the computer-based user data agent to collect the user data further cause the computer-based user data agent to monitor online behavior of the user on behalf of the user.

16. The system of claim 15, wherein the instructions that, when executed by the one or more processors, cause the computer-based user data agent to monitor the online behavior of the user further cause the computer-based user data agent to monitor browser cookies generated by the user.

17. The system of claim 14, wherein the instructions that, when executed by the one or more processors, cause the computer-based user data agent to collect the user data further cause the computer-based user data agent to obtain information associated with the user from a user account.

18. The system of claim 14, wherein the instructions that, when executed by the one or more processors, cause the computer-based user data agent to generate the alternate persona further cause the computer-based user data agent to:

train a model with machine learning based on the user profile or using a set of sample user profiles; and use a trained model to generate the alternate persona.

19. The system of claim 14, wherein the instructions that, when executed by the one or more processors, cause the computer-based user data agent to generate the alternate persona further cause the computer-based user data agent to:

generate multiple candidate personas; and select the alternate persona from amongst the candidate personas.

20. The system of claim 19, wherein the computer-based user data agent further includes a user interface; and wherein the user accesses the user interface to review the candidate personas and to set parameters for selecting the alternate persona.

* * * * *